United States Patent
Patil et al.

(10) Patent No.: US 12,122,220 B2
(45) Date of Patent: Oct. 22, 2024

(54) AIRVENT ASSEMBLY FOR A VEHICLE INTERIOR

(71) Applicant: Faurecia India Private Limited, Pune (IN)

(72) Inventors: Sachin Patil, Pune (IN); Avinash Kadaganve, Pune (IN)

(73) Assignee: FAURECIA INDIA PRIVATE LIMITED, Pune (IN)

( * ) Notice: Subject to any disclaimer, the term of this patent is extended or adjusted under 35 U.S.C. 154(b) by 31 days.

(21) Appl. No.: 17/388,898

(22) Filed: Jul. 29, 2021

(65) Prior Publication Data
US 2022/0032739 A1 Feb. 3, 2022

(30) Foreign Application Priority Data
Jul. 29, 2020 (IN) .............................. 202021032542

(51) Int. Cl.
B60H 1/34 (2006.01)

(52) U.S. Cl.
CPC ... B60H 1/3421 (2013.01); *B60H 2001/3471* (2013.01); *Y10T 74/19879* (2015.01)

(58) Field of Classification Search
CPC B60H 1/3421; B60H 1/34; B60H 2001/3478; B60H 2001/00092; B60H 2001/3471; F24F 13/14; Y10T 74/19879
See application file for complete search history.

(56) References Cited

U.S. PATENT DOCUMENTS

| | | | | |
|---|---|---|---|---|
| 3,701,311 A | * | 10/1972 | McLarty | F24F 13/15 454/319 |
| 4,312,381 A | * | 1/1982 | Ratner | F16K 31/528 251/249 |
| 5,281,049 A | * | 1/1994 | Holt | B60H 1/0065 74/105 |
| 6,209,404 B1 | * | 4/2001 | Le | G05G 1/08 74/435 |
| 2017/0021701 A1 | * | 1/2017 | Belzons | B60H 1/3421 |
| 2017/0305238 A1 | * | 10/2017 | Brinas | B60H 1/242 |
| 2018/0170153 A1 | * | 6/2018 | Lee | B60H 1/3421 |
| 2019/0092137 A1 | * | 3/2019 | Lee | B60H 1/3421 |
| 2019/0193526 A1 | * | 6/2019 | Stark | F24F 13/15 |

FOREIGN PATENT DOCUMENTS

KR       20120002664 A   *   1/2012

* cited by examiner

*Primary Examiner* — Edelmira Bosques
*Assistant Examiner* — Brett Peterson Mallon
(74) *Attorney, Agent, or Firm* — Reising Ethington P.C.

(57) ABSTRACT

An airvent assembly for a vehicle interior. The airvent assembly has a vane, a first flap, a first lever, a second lever and a movable disk. The first and the second levers are connected to the vane and the first flap, respectively. The first and the second levers have a first and a second guiding path, respectively. The movable disk is configured with a first and a second guiding pin. Upon actuation of the movable disk, one of the first or the second guiding pin engages with and moves within the first or the second guiding path to move the vane or the first flap to change the direction of an airflow or to at least partially prevent the airflow.

6 Claims, 5 Drawing Sheets

AIRVENT ASSEMBLY FOR A VEHICLE INTERIOR

TECHNICAL FIELD

The present invention relates to an airvent assembly for a vehicle interior. More specifically, the present invention relates to a mechanism for operating an airvent assembly for a vehicle interior.

BACKGROUND

Air-vents inside a vehicle are known for guiding and distributing the air inside the vehicle from an HVAC duct connected therewith. Generally, these air-vents are provided with vanes for directing and deflecting the air according to a preference of an occupant inside the vehicle. The current air-vents may have a plurality of vanes and flaps, which are vertically or horizontally aligned for changing and adjusting the air directivity into the vehicle interior. The flaps may be used to shut off or prevent/limit the flow of the air into the vehicle interior and the vanes for directing the air into the vehicle interior.

These vanes and flaps may have a complex mechanism and assembly, which affects their movement. Both the vanes and the flaps have to be controlled/moved independently by two different operating mechanisms. It can be either using two different motors or thumbwheel with gear drives, thus making the assembly complex and may require more space to accommodate thus bulky. Further, a significant amount of time is required for assembling these vanes. Moulding of these vanes also may amount a substantial time.

Therefore, there is a need to provide a mechanism for operating the air-vent, which overcomes few or all of the drawbacks of the prior art.

SUMMARY

An object of the present invention is to provide an airvent assembly of a vehicle interior.

Another object of the present invention is to provide an airvent assembly for a vehicle interior, which can control/move the individual movement of the flap and vane with a single actuator manual or motorized.

Yet another object of the present invention is to provide an airvent assembly of a vehicle interior, which is compact and can substantially reduce the complexity in assembling the airvent.

One more object of the present invention is to provide an airvent assembly of a vehicle interior, which can be easily operated and economical in design.

Still another object of the present invention is to provide an airvent assembly of a vehicle interior, which is robust in construction.

According to one aspect of the present invention, there is provided with an airvent assembly for a vehicle interior. The airvent assembly includes a vane to change the direction of airflow into the vehicle interior and a flap to at least partially prevent the airflow respectively into the vehicle interior. In an embodiment, two flaps like a first flap and a second flap may be arranged in the airvent assembly with the vane configured in between the flaps.

The vane directs the airflow and the two flaps at least partially prevent the airflow into the vehicle interior. The airvent assembly can be assembled horizontally or vertically in an interior panel of the vehicle. By way of non-limiting example, when the airvent is configured horizontally, the vane and the flaps are aligned horizontally. Similarly, when the airvent is assembled vertically, the vane and the flaps are aligned vertically to guide the airflow into the vehicle interior.

Further, the airvent assembly includes a first lever, a second lever and an operating member. The first lever, the second lever, and the operating member is arranged inside a housing. In an embodiment, the operating member is motor-operated and coupled with a spur gear drive. In another embodiment, a manually operated thumbwheel is coupled to a gear drive for operating the airvent manually.

The first lever may be connected and mounted on a top portion of the vane. The second lever is connected and mounted on a top portion of one of the flaps. Both the first lever and the second lever may have an engaging portion, which engages with respective slots of the flap and vane. In an embodiment, the second lever may be arranged on a top portion of the flap. It may be obvious to a person skilled in the art to mount the second lever on a top portion of the second flap.

Further, a movable disk is configured inside the airvent assembly. In the present embodiment, the movable disk includes a first guiding pin and a second guiding pin. Corresponding to the guiding pins, the first lever has a first guiding path and the second lever has a second guiding path.

Further, the operating member is engageably connected to the movable disk. The rotation of the operating member enables engagement of the first guiding pin or the second guiding pin of the movable disk with the first guiding path or the second guiding path of the first lever or the second lever thereof for moving the vane or the flaps.

Further, the gear drive includes a first gear and a second gear. The first gear is operably arranged in or on the operating member and the second gear. The second gear is arranged in or on the movable disk. The operation of the operating member enables a rotational motion of the movable disk to move the vane or the flap.

In a first aspect, upon actuation of the movable disk the first guiding pin engages with and moves within the first guiding path of the first lever to move the vane to change the direction of airflow into the vehicle interior. Specifically, upon operating the operating member, the first guide pin engages with and moves within the guiding path of the first lever to rotate the vane around a first rotational axis to change the direction of the air flow into the vehicle interior. The rotation of the vane enables the deflection of air in leftward or rightwards directivity. When the airvent is arranged horizontally, the vane deflects in an upward or a downward direction.

In a second aspect, upon actuation of the movable disk the second guiding pin engages with and moves within the second guiding path of the second lever to at least partially prevent the airflow into the vehicle interior. Specifically, upon further operating/rotating the operating member the first guide pin disengages from the first guide path and correspondingly engages the second guide pin with the guide path of the second lever to rotate the flap around a second rotating axis. When the second guide pin engages with the guide path, the second lever and the flap associated with the second lever rotates in a predefined direction to at least partially prevent the airflow into the vehicle interior.

Further, an edge portion of the first flap and an edge portion of the second flap are configured with a first flap gear and a second flap gear respectively. The flap gears are connected to each other for rotating the first flap and the second flap in opposite direction to at least partially prevent the airflow and also to configure a shut-off position to completely prevent the airflow into the vehicle interior.

Further, the first lever and the second lever have a pair of first arc profile and a pair of second arc profiles respectively abutting to a circular or semi-circular profile of the movable disk. This ensures smooth motion of both the first lever and the second lever upon actuation of the operating member.

BRIEF DESCRIPTION OF THE DRAWINGS

Other features and advantages of the invention will become apparent when reading the detailed description given below, purely by way of example and in a non-limitative manner, referring to the following figures.

DETAILED DESCRIPTION

An embodiment of this invention, illustrating its features, will now be described in detail. The words "comprising," "having, "containing," and "including," and other forms thereof, are intended to be equivalent in meaning and be open ended in that an item or items following any one of these words is not meant to be an exhaustive listing of such item or items, or meant to be limited to only the listed item or items.

The terms "first," "second," and the like, herein do not denote any order, quantity, or importance, but rather are used to distinguish one element from another, and the terms "an" and "a" herein do not denote a limitation of quantity, but rather denote the presence of at least one of the referenced item.

The disclosed embodiments are merely exemplary of the invention, which may be embodied in various forms.

Air-vents inside a vehicle are known for guiding and circulating air inside the vehicle from an HVAC duct. The current air-vents may have a plurality of vane and flaps which are vertically or horizontally aligned for changing and controlling the air directivity into the vehicle interior. The flaps may be used to shut off or prevent/limit the flow of air into the vehicle interior and the vane for directing the air into the vehicle interior. Both the vane and the flaps have to be controlled/moved independently by two different operating mechanisms.

Figure 1:
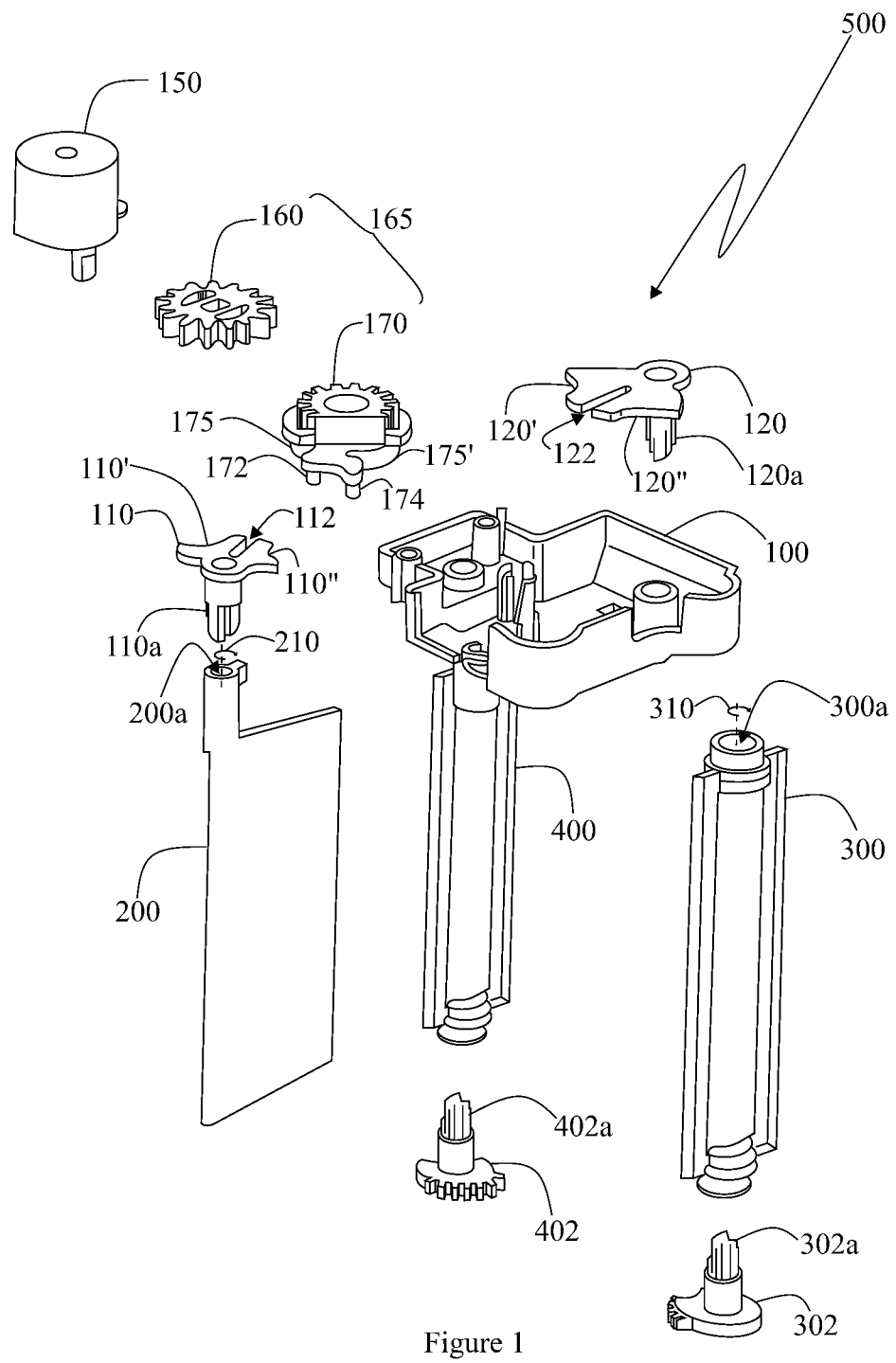
FIG. 1 illustrates an exploded view of an airvent assembly in accordance with an embodiment of the present invention.
Figure 2:
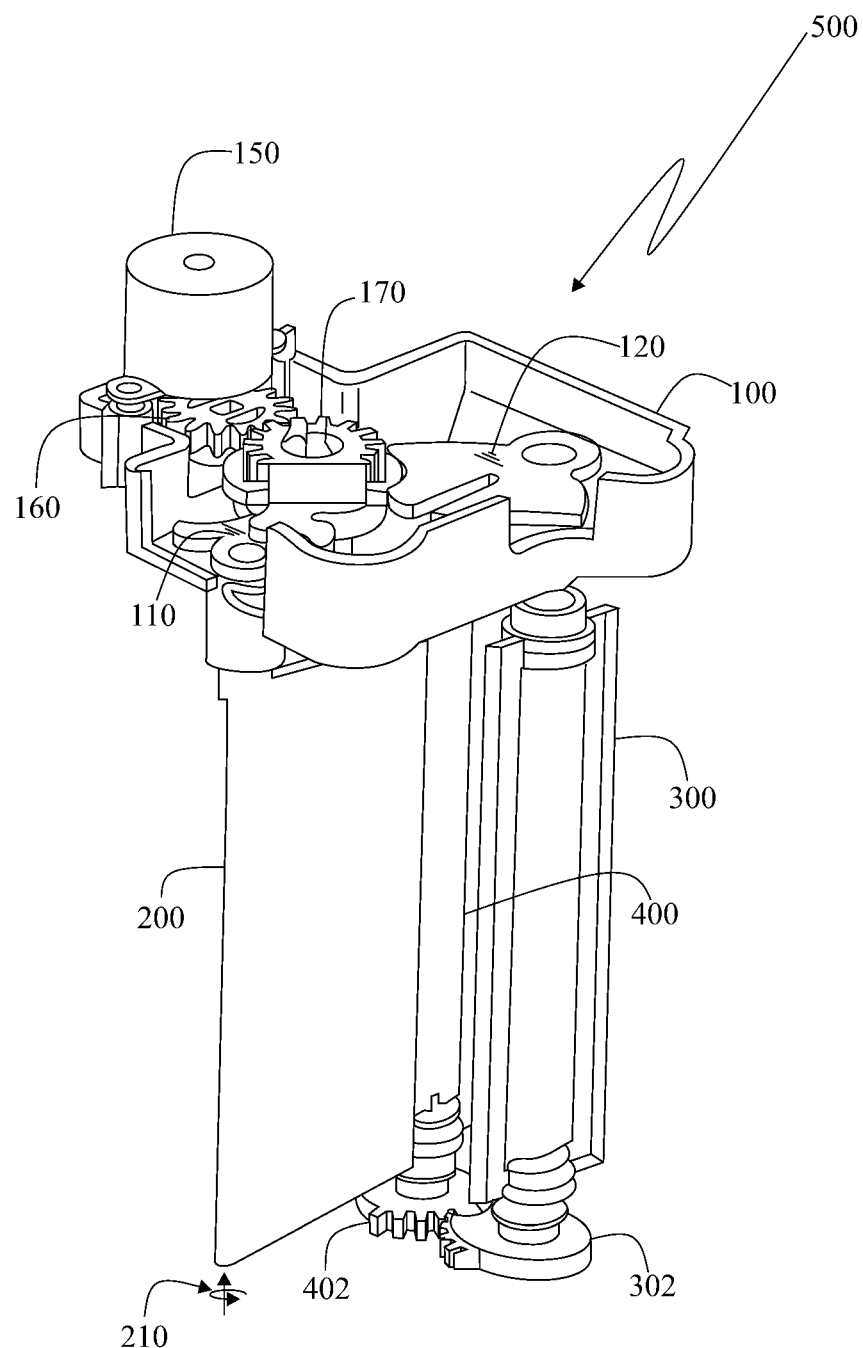
FIG. 2 illustrates an assembled view of the airvent assembly of FIG. 1.

Referring now to FIGS. 1 and 2, an airvent assembly (500) for a vehicle interior in accordance with an embodiment of the present invention is illustrated. The airvent assembly (500) includes a vane (200) to change the direction of airflow into the vehicle interior and a flap to at least partially prevents the airflow respectively into the vehicle interior. The present embodiment is shown to have two flaps like a first flap (300), and a second flap (400) arranged in the airvent assembly (500) adjacent to each other with the vane (200) configured in between the flaps (300, 400). The vane (200) directs the airflow and the two flaps, a first flap (300), a second flap (400) prevent the airflow into the vehicle interior. The airvent assembly (500) can be assembled horizontally or vertically in the interior panel of the vehicle. By way of a non-limiting example, when the airvent assembly (500) is configured horizontally, the vane (200) and the flaps (300, 400) are aligned horizontally. Similarly, when the airvent assembly (500) is configured vertically, the vane (200) and the flaps (300, 400) are aligned vertically to guide the airflow into the vehicle interior.

Figure 3:
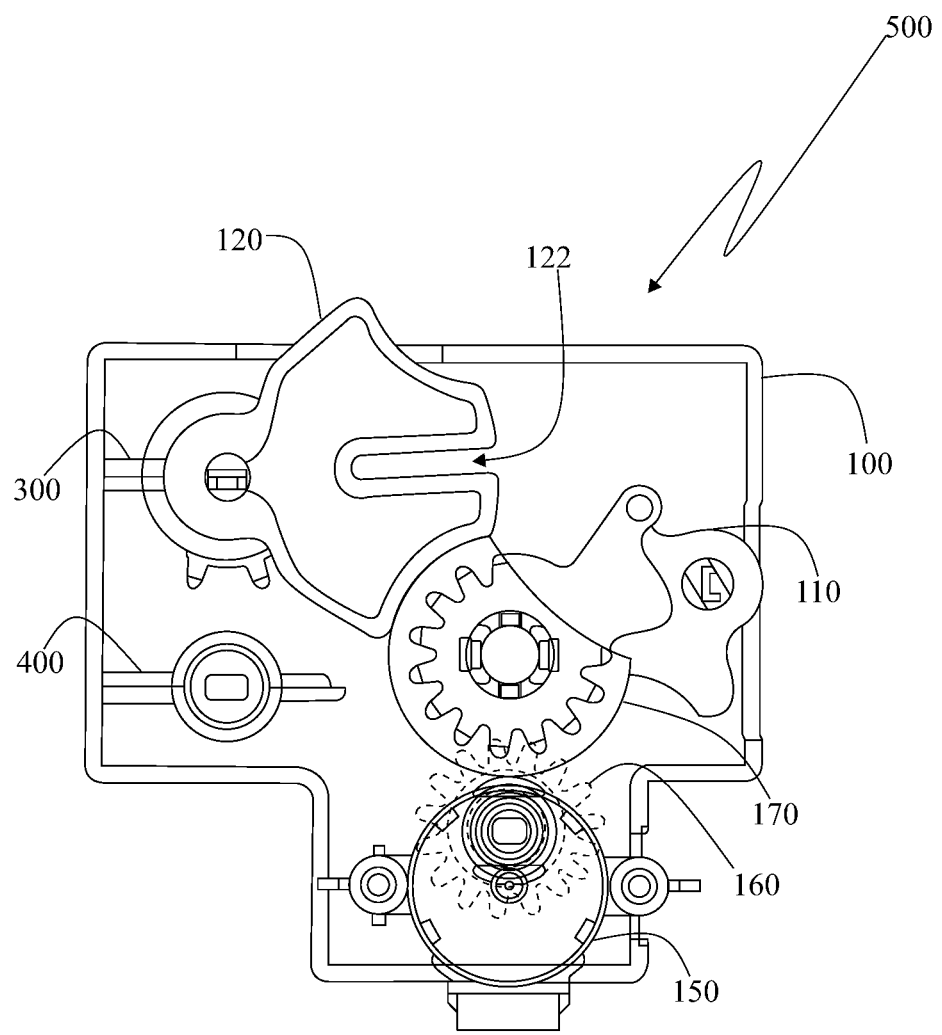
FIG. 3 illustrates a top view of the FIG. 2.
Figure 4:
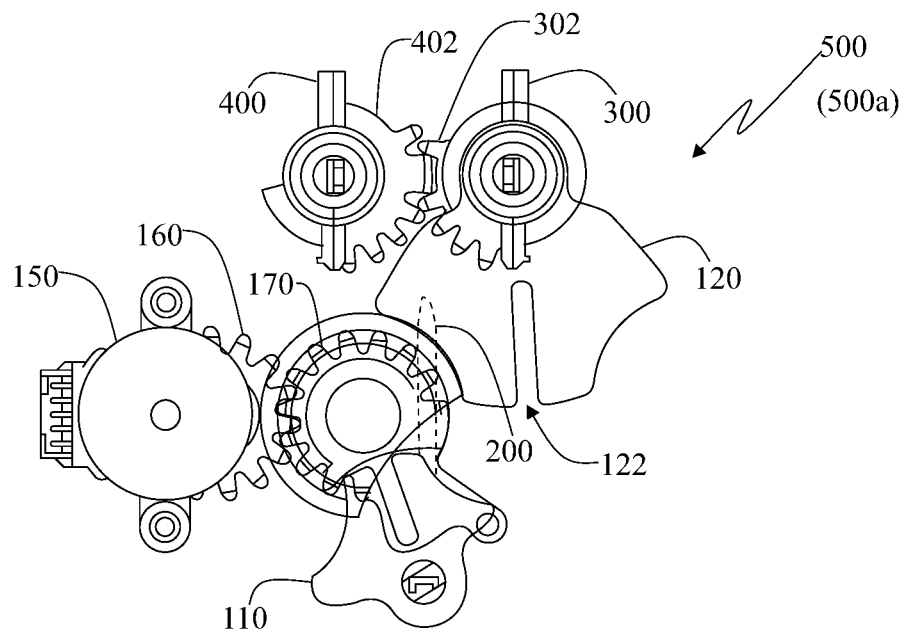
FIG. 4 illustrates a schematic representation of the airvent assembly shown in FIG. 2 with a flap of the airvent assembly being in an open position.

Referring now to FIGS. 3 and 4, the airvent assembly (500) includes a first lever (110), a second lever (120) and an operating member (150). The first lever (110), the second lever (120) and the operating member (150) is arranged inside a housing (100). In the present embodiment, the operating member (150) is a motor-operated coupled with a spur gear drive (165). It is obvious to a person skilled in the art to configure a manually operated thumbwheel coupled to a gear drive for operating the airvent (500) manually.

Referring again to FIG. 2, the first lever (110) is connected and mounted on a top portion of the vane (200) and the second lever (120) is connected and mounted on a top portion of the first flaps (300). Both the first lever (110) and the second lever (120) has an engaging portion, which engages with respective slots of the vane (200) and the first flap (300). Specifically, the first lever (110) has a first male portion (110a) which is releasably lockable with a first female portion (200a) of the vane (200) and the second lever (120) has a second male portion (120a), which is releasably lockable with a second slot (300a) of the first flap (300). The present embodiment is shown to provide the second lever (120) arranged on a top portion of the first flap (300). It may be obvious to a person skilled in the art to mount the second lever (120) on a top portion of the second flap (400).

Further, a movable disk (175) is configured inside the airvent assembly (500). In the present embodiment, the movable disk (175) includes a first guiding pin (172) and a second guiding pin (174). Corresponding to the guiding pins (172, 174), the first lever (110) has a first guiding path (112) and the second lever has a second guiding path (122).

The guiding pins (172, 174) are small protrusions, which extend vertically downwards from the movable disk (175) to engage with the first lever (110) and the second lever (120) respectively. Specifically, the guiding pins (172, 174) are configured to engage with the guiding path (112, 122) of the corresponding first lever (110) and the second lever (120). The guiding path (112, 122) is a cavity, which is adapted to receive the guiding pins (172, 174).

Further, the operating member (150) is engageably connected to the movable disk (175). The rotation of the operating member (150) enables engagement of the first guiding pin (172) or the second guiding pin (174) of the movable disk (175) with the first guiding path (112) or the second guiding path (122) of the first lever (110) or the second lever (120) thereof for moving the vane (200) or the first flap (300).

Further, the gear drive (165) includes a first gear (160) and a second gear (170). The first gear (160) is operably arranged in or on the operating member (150) and positioned adjacent to the second gear (170). The second gear (170) is arranged in or on the movable disk (175). The operation of the operating member (150) enables a rotational motion of the movable disk (175) to move the vane (200) or the first flap (300).

Figure 5:
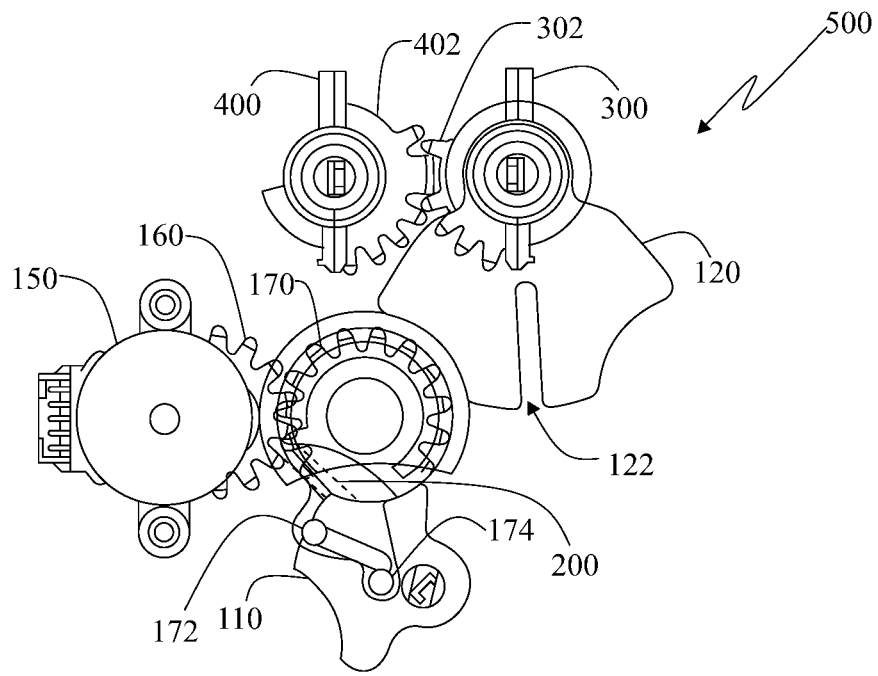
FIG. 5 illustrates a schematic representation of the airvent assembly shown in FIG. 2, when a first guide pin of the airvent assembly engages with a first lever of the airvent assembly moving a vane of the airvent assembly to a right directivity.
Figure 6:
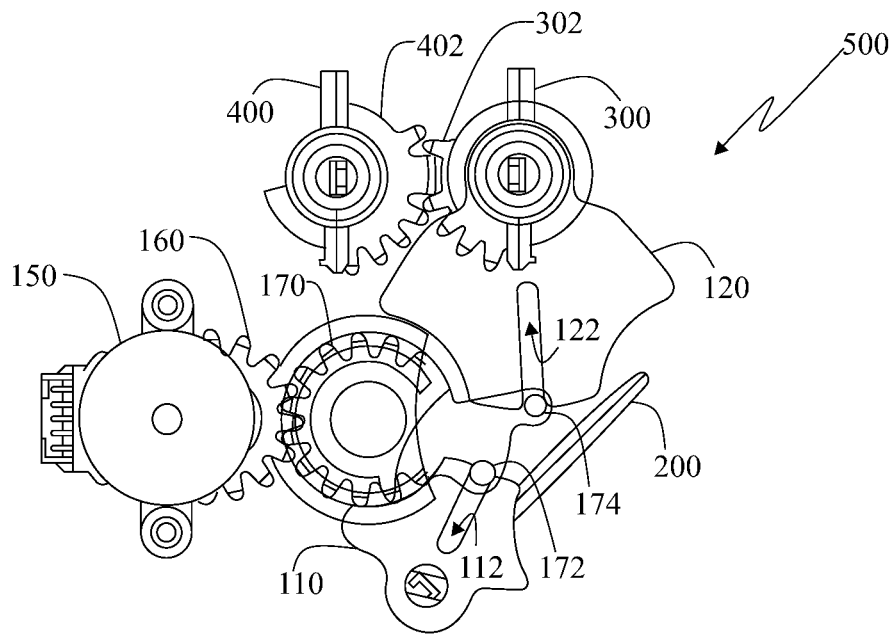
FIG. 6 illustrates a schematic representation of the FIG. 5 when the first guide pin engages with the first lever moving the vane of to a left directivity.

In a first aspect, upon actuation of the movable disk (175) the first guiding pin (172) engages with and moves within the first guiding path (112) of the first lever (110) to move the vane (200) to change the direction of airflow into the vehicle interior. Specifically, upon operating the operating member (150), the first guide pin (172) engages with and moves within the guiding path (112) of the first lever (110) to rotate the vane (200) around a first rotational axis (210) to change the direction of the air flow into the vehicle interior. The rotation of the vane (200) enables the deflection of the air in leftward or rightwards directivity, as shown in FIGS. 4 and 5. When the airvent (500) is arranged horizontally, the vane (200) deflects in an upward or downward direction.

Figure 7:
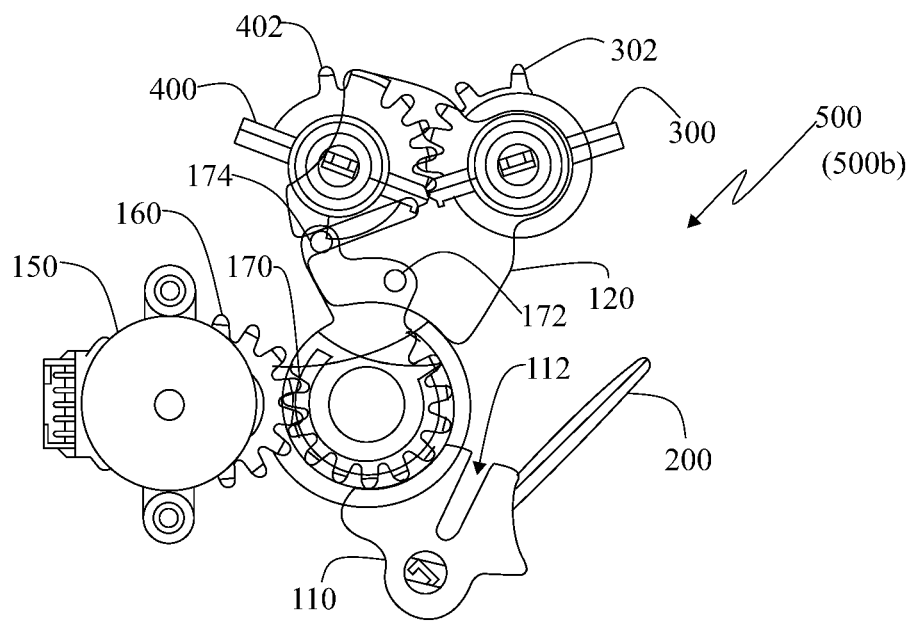
FIG. 7 illustrates a schematic representation of the airvent assembly shown in FIG. 2, when the first guide pin disengages and a second guide pin of the airvent assembly engages with a second lever of the airvent assembly moving flaps of the airvent assembly to a shut-off position.

In a second aspect by referring to the FIG. 7, upon actuation of the movable disk (175), the second guiding pin (174) engages with and moves within the second guiding path (122) of the second lever (120) to move the first flap (300) to at least partially prevent the airflow into the vehicle interior. Specifically, upon further operating/rotating the operating member (150), the first guide pin (172) disengages from the first guide path (112) and correspondingly engages the second guide pin (174) with the guide path (122) of the second lever (120) to rotate the first flap (300) around a second rotational axis (310). When the second guide pin (174) engages with the guide path (122), the second lever (120) and the first flap (300) associated with the second lever (120) rotates in a predefined direction to at least partially prevent the airflow into the vehicle interior.

In the present embodiment, a portion of the movable disk (175) is accessible to a user to actuate the movement of the vane (200) or the first flap (300).

Further, an edge portion of the first flap (300) and an edge portion of the second flap (400) are configured with a first flap gear (302) and a second flap gear (402) respectively. The flap gears (302 and 402) are connected to each other for rotating the first flap (300) and the second flap (400) in opposite direction to at least partially prevent the airflow and also to configure a shut-off position (500b) to completely prevent the airflow into the vehicle interior. The edge portion can be a top edge portion or bottom edge portion of the flaps (300, 400).

Referring now to FIGS. 1 and 2, in the present embodiment, the flap gears (302, 402) are arranged at the bottom edge portion of the flaps (300, 400). The flap gears (302, 402) has an engaging portion (302a, 402a), which engages with the respective flaps (300, 400). When the first flap (300) associated with the second lever (120) rotates, it enables the flap gears (302, 402) to rotate both the flaps (300, 400) from an open position (500a) to the shut-off position (500b) to prevent the airflow into the vehicle interior. In the present embodiment, the flaps (300, 400) rotates opposite to each other to configure the shut-off position (500b). By way of a non-limiting example, when the first flap (300) associated with the second lever (120) rotates in a clockwise direction, the second flap (400) rotates anticlockwise to configure the shut-off position (500b) and vice versa. In the shut-off position (500b), the flaps (300, 400) prevent the airflow into the vehicle interior.

Further, the first lever (110) and the second lever (120) has a pair of first arc profile (110' and 110") and a pair of second arc profiles (120' and 120") respectively abutting to a circular or semi-circular profile (175') of the movable disk (175). This ensures smooth motion of both the first lever (110) and the second lever (120) upon actuation of the operating member (150). The vane (200) may remain in left directivity during the flaps (300, 400) stroke because of locking in the circular profile or semi-circular profile (175') of the movable disk (170).

Therefore, the airvent assembly (500) can control/move the individual movement of the flap (300, 400) and vane (200) with single motor/single motion input in a sequential manner. Further, it can substantially reduce the complexity in assembling the airvent assembly (500). The airvent assembly (500) can be easily operable and economical in design. Also, it is robust in construction.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the scope of the claims of the present invention.

We claim:

1. An airvent assembly for a vehicle interior, the airvent assembly comprising:
   a vane to change the direction of an airflow into the vehicle interior and a first flap to at least partially prevent the airflow into the vehicle interior;
   a first lever connected to the vane and a second lever connected to the first flap, the first lever having a first guiding path and the second lever having a second guiding path; and
   a movable disk having a first guiding pin and a second guiding pin, wherein the movable disk can be actuated so as to move the first guiding pin within the first guiding path of the first lever to move the vane to change the direction of the airflow into the vehicle interior and wherein the movable disk can also be actuated so as to move the second guiding pin within the second guiding path of the second lever to move the first flap to at least partially prevent the airflow into the vehicle interior;
   wherein a second flap is arranged adjacent to the first flap, and
   wherein an edge portion of the first flap and an edge portion of the second flap are configured with a first flap gear and a second flap gear respectively, the flap gears are directly connected to each other for rotating the first flap and the second flap in opposite directions to at least partially prevent the airflow and also to configure a shut-off position to completely prevent the airflow into the vehicle interior.

2. The airvent assembly as claimed in claim 1, wherein an operating member is connected to the movable disk, such that actuation of the operating member causes movement of the movable disk and the guiding pins, and wherein a spur gear drive having a first gear is arranged in or on the operating member and a second gear arranged in or on the movable disk such that actuation of the operating member causes movement of the movable disk and the guiding pins so as to control the vane or the first flap.

3. The airvent assembly as claimed in claim 2, wherein the operating member is motor-operated or manually operated.

4. The airvent assembly as claimed in claim 2, wherein upon actuating the operating member, the first guiding pin engages with and moves within the first guiding path of the first lever to rotate the vane around a first rotational axis to change the direction of the air flow into the vehicle interior or upon further actuation of the operating member, the first guiding pin disengages from the first guiding path of the first lever and the second guiding pin engages with and moves within the second guiding path of the second lever to rotate the first flap around a second rotational axis to at least partially prevent the airflow into the vehicle interior.

5. The airvent assembly as claimed in claim 1, wherein the first lever and the second lever has a pair of first arc profiles and a pair of second arc profiles respectively abutting to a circular or a semi-circular profile of the movable disk which ensures smooth motion of both the first lever and the second lever upon actuation of an operating member.

6. The airvent assembly as claimed in claim 1, wherein the first lever has a first male portion which is releasably lockable with a first female portion of the vane and the second lever has a second male portion which is releasably lockable with a second female portion of the first flap.

* * * * *